United States Patent
Jeong et al.

(10) Patent No.: US 7,480,341 B2
(45) Date of Patent: Jan. 20, 2009

(54) TRANSMITTING AND RECEIVING APPARATUS AND METHOD FOR OPTIMIZING PERFORMANCE OF ADAPTIVE MODULATION AND CODING IN A MULTIPLE INPUT AND MULTIPLE OUTPUT ANTENNA COMMUNICATION SYSTEM

(75) Inventors: Su-Ryong Jeong, Suwon-si (KR); Seok-Hyun Yoon, Suwon-si (KR); Sung-Kwon Hong, Seoul (KR); Young-Kwon Cho, Suwon-si (KR); Chang-Ho Suh, Seongnam-si (KR)

(73) Assignee: Samsung Electronics Co., LTD (KR)

( * ) Notice: Subject to any disclaimer, the term of this patent is extended or adjusted under 35 U.S.C. 154(b) by 636 days.

(21) Appl. No.: 11/253,398

(22) Filed: Oct. 19, 2005

(65) Prior Publication Data
US 2006/0115014 A1 Jun. 1, 2006

(30) Foreign Application Priority Data
Oct. 19, 2004 (KR) .................... 10-2004-0083705

(51) Int. Cl.
*H04B 7/02* (2006.01)
*H04L 1/02* (2006.01)

(52) U.S. Cl. .............. 375/267; 375/299; 375/346; 375/347; 375/349; 370/334

(58) Field of Classification Search ............... 375/267, 375/299, 346, 347, 349; 370/334
See application file for complete search history.

(56) References Cited

U.S. PATENT DOCUMENTS

2004/0141566 A1 * 7/2004 Kim et al. .................. 375/267
2006/0034382 A1 * 2/2006 Ozluturk et al. ............ 375/267

* cited by examiner

*Primary Examiner*—Curtis B Odom
(74) *Attorney, Agent, or Firm*—The Farrell Law Firm, PC

(57) ABSTRACT

A transmitting and receiving apparatus and method for optimizing performance of an adaptive modulation and coding (AMC) in a multiple input and multiple output antenna (MIMO) communication system. When the AMC is applied to the MIMO system, the optimal scheme is different depending on the MIMO channel situation, the maximum transmission power, and the maximum modulation order. The transmitting apparatus includes an ordering selector that selects a successive interference cancellation (SIC) scheme in order to obtain a maximum MIMO-AMC performance, and the receiving apparatus includes a channel quality information (CQI) generator corresponding to the SIC scheme selected at the transmitting apparatus.

11 Claims, 13 Drawing Sheets

TRANSMITTING AND RECEIVING APPARATUS AND METHOD FOR OPTIMIZING PERFORMANCE OF ADAPTIVE MODULATION AND CODING IN A MULTIPLE INPUT AND MULTIPLE OUTPUT ANTENNA COMMUNICATION SYSTEM

PRIORITY

This application claims priority under 35 U.S.C. § 119 to applications entitled "Transmitting And Receiving Apparatus And Method For Optimizing Performance Of Adaptive Modulation And Coding In Multiple Input And Multiple Output Antenna Communication System" filed in the Korean Intellectual Property Office on Oct. 19, 2004 and assigned Serial. No. 2004-83705, the contents of which are herein incorporated by reference.

BACKGROUND OF THE INVENTION

1. Field of the Invention

The present invention relates generally to a transmitting and receiving apparatus and method for optimizing performance of an adaptive modulation and coding (AMC) in a multiple input and multiple output antenna (MIMO) communication system. More specifically, the present invention relates a transmitting apparatus of a MIMO system, which includes an ordering selector that selects a successive interference cancellation (SIC) scheme to obtain a maximum MIMO-AMC performance, and a receiving apparatus, which includes a channel quality information (CQI) generator (a MIMO equivalent channel generator) corresponding to the SIC scheme selected at the transmitting apparatus.

2. Description of the Related Art

Multiple input and multiple output antenna (MIMO) technologies have been introduced for increasing a transmission data rate. An example of MIMO technology is spatial multiplexing (SM), which enables high-speed data transmission by transmitting different data via multiple transmit (Tx) antennas. Recently, in MIMO systems, space-time coding (STC) has been proposed, which can obtain a diversity gain by transmitting the same data via multiple Tx antennas. However, high SM gain and maximum diversity gain cannot be obtained at the same time. Accordingly, the STC for maximizing the diversity gain has difficulty in maximizing the transmission data rate. Although many attempts have been made to simultaneously obtain the SM gain and the diversity gain, these technologies have not been yet implemented in real applications.

There is proposed a technology for increasing the transmission data rate in the MIMO system, that is, for obtaining the maximum SM gain. More specifically, there is proposed a technology for increasing transmission rate when an adaptive modulation and coding (AMC) is applied to the MIMO system. Hereinafter, the performance of the AMC in the MIMO system means a transmission data rate when AMC is applied to a MIMO system. In addition, the terms: transmitting apparatus, transmitter, or transmitting terminal will be used interchangeably.

As one of methods for increasing the transmission data rate in the MIMO system, MIMO channel information measured at a receiver is fed back to a transmitter and an AMC is applied, thereby maximizing system capacity. Practically, it has been known that a channel capacity in the MIMO channel can be maximized using a singular value decomposition (SVD). However, when the SVD is performed an accurate channel value must be known. In a real system, a receiver estimates a channel value and transmits it to a transmitter through a feedback channel. Serious errors may occur during this process.

For the MIMO channel, a plurality of receive (Rx) antenna channel estimation values, which are transmitted from a plurality of antennas, are fed back. Therefore, a large number of the feedback values cause the serious degradation of performance due to error. Accordingly, the application of the SVD to the real system is not practical.

Another technology is a Vertical Bell Laboratories Space Time (V-BLAST). According to V-BLAST technology, a transmitter transmits independent signals through a plurality of Tx antennas, and a receiver differentiates the transmitted data through an appropriate signal processing. The receiver can obtain satisfactory performance using a successive interference cancellation (SIC) method. The SIC method includes a forward ordering policy and a reverse ordering policy. Of the two, the forward ordering policy is typical.

According to the forward ordering policy, MIMO equivalent channels distorting signals transmitted through Tx antennas are removed from MIMO equivalent channel with the highest gain. Accordingly, the forward ordering policy can prevent serious performance degradation occurring in error transmission. However, this prevention of the performance degradation is achieved when the AMC is not applied to the transmitter.

When the AMC is applied to the MIMO system, a feedback channel value based on the forwarding ordering policy is varied depending on channel states because the AMC is determined not by a general MIMO channel but by a MIMO equivalent channel, and its value is varied depending on the ordering policies. Accordingly, when the AMC is applied, it has to be determined which of the forward ordering policy and the reverse ordering policy is good. In addition, parameters necessary for determining the ordering policy need to be selected and the reference needs to be determined.

SUMMARY OF THE INVENTION

Therefore, the present invention has been designed to substantially solve at least the above problems and/or disadvantages and to provide at least the advantages below.

Accordingly, an object of the present invention is to provide a transmitting apparatus and method for optimizing a MIMO-AMC performance, i.e., AMC performance when an AMC is applied to a MIMO communication system.

Another object of the present invention is to provide a receiving apparatus and method for optimizing MIMO-AMC performance.

A further object of the present invention is to provide an ordering selector for selecting an SIC ordering policy used in the transmitting apparatus so as to optimize MIMO-AMC performance, and a method of selecting the same.

A further object of the present invention is to provide a CQI generator for generating a CQI used in the receiving apparatus in order to optimize MIMO-AMC performance, and a method of generating the same.

According to one aspect of the present invention, a transmitter of a MIMO system using an AMC includes: an AMC determiner in which a total transmission power and a maximum modulation order are preset. The AMC determiner receives MIMO equivalent channel information fed back from a receiver, determines an AMC level to be used in a transmit (Tx) antenna by using the total transmission power, the modulation order, and the MIMO equivalent channel information, and generates AMC level information. An ordering selector in which the total transmission power and the maximum modulation order are preset, receives the MIMO equivalent channel information fed back from the receiver, determines ordering policy information to be used in the receiver by using the total transmission power, the modulation order, and the MIMO equivalent channel information, and generates the ordering policy formation. A signal selector receives the AMC level information from the AMC determiner and the ordering policy information from the ordering selector, transmits data signals when a transmission interval is an interval for data signal transmission, and transmits the ordering policy information and the AMC level information when the transmission interval is an interval for control information transmission. An adaptive modulator modulates the ordering policy information and the AMC level information into predefined specific AMC level, and adaptively modulates the data signals according to the AMC level information.

In addition, the present invention provides a transmitting method of the transmitter.

According to another aspect of the present invention, a receiver of a MIMO system using an AMC includes a MIMO channel estimator for estimating a MIMO channel value by using a pilot channel or traffic channel; a SIC (successive interference cancellation)-type detector for receiving data signal and control information, the control information including an ordering policy information and an AMC level information, from a transmitter through a receive (Rx) antenna, and transmitting the data signal and the control signal to a demultiplexer, determining an SIC ordering policy according to the ordering policy information, and for determining a modulation scheme of the received data signal according to the AMC level information; the demultiplexer for receiving the data signal, the ordering policy information, and the AMC level information from the SIC-type detector, transmitting the data signal in an interval for data signal transmission; transmitting the ordering policy information and the AMC level information in an interval for control information transmission, and feeding back the AMC level information to the SIC-type detector; and a channel quality information (CQI) generator for generating a MIMO equivalent channel based on the ordering policy by using the estimated MIMO channel value and the ordering policy information, and transmitting the MIMO equivalent channel to the transmitter.

In addition, the present invention provides a receiving method of the receiver.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described in detail herein below with reference to the accompanying drawings. In the following description, well-known functions or constructions are not described in detail since they would obscure the invention in unnecessary detail.

According to the present invention, a transmitter includes an ordering selector that selects an SIC scheme in order to optimize AMC gain, and a receiver includes a CQI generator corresponding to the SIC scheme selected at the transmitter.

Figure 1:
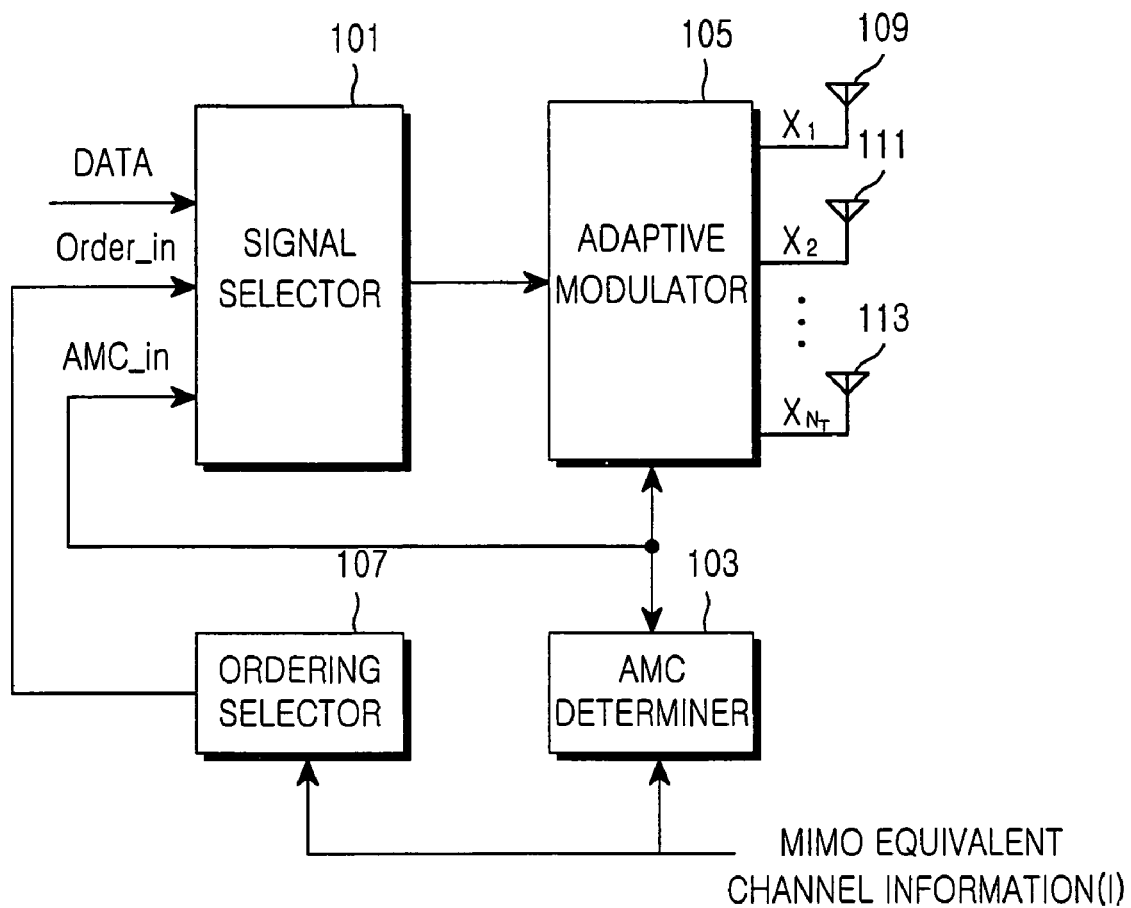
FIG. 1 is a block diagram of a transmitter with an ordering selector in a MIMO system according to an embodiment of the present invention.

FIG. 1 is a block diagram of a transmitter for a MIMO system having a plurality of Tx antennas and a plurality of Rx antennas according to an embodiment of the present invention. The transmitter includes an ordering selector 107, which receives a MIMO equivalent channel information I from a receiver stage, and determines an ordering policy to maximize an AMC performance (gain) using a preset total transmission power $P_T$ and maximum modulation order M. The MIMO equivalent channel information I is a value fed back from a terminal used as a receiver and is used to determine an AMC level. This value has as many elements as the number of Tx antennas, i.e., $N_T$. Because this value is equivalent channel information, it represents $N_T$ number of channel information, not $N_T \times N_R$ number of channel information, where $N_T$ and $N_R$ denote the number of Tx antennas and the number of Rx antennas, respectively.

The total transmission power $P_T$ represents a maximum transmission power that can be used at the transmitter stage. When M (maximum modulation order) is 1, it represents a BPSK scheme, and when M is 2, it represents a QPSK scheme. When M is 4, it represents a 16QAM scheme. The total transmission power $P_T$ and the maximum modulation order M are values preset to the ordering selector 107, and are important factors for determining a level of the AMC.

The ordering selector 107 generates an Order_In signal representing an SIC ordering information. An algorithm for calculating the Order_In signal will be described later with reference to FIGS. 3A and 3B.

The Order_In signal is transmitted to a signal selector 101. The AMC determiner 103 determines AMC levels suitable for the Tx antennas using the MIMO equivalent channel information I fed back from the receiver, the total transmission power $P_T$, and the maximum modulation order M. The AMC level is determined by a Bit Loading Algorithm using a Greedy Algorithm developed by Levin and Campello.

A "Greedy Algorithm" in the bit and power allocation is an algorithm that allocates bit to a channel of the lowest power consumption among a plurality of equivalent channels when 1 bit increases. By repeating this algorithm until the total power is dissipated, the largest number of total bits can be transmitted with a restricted transmission power. The term "Greedy" is derived from the meaning that a greedy and competent person shares more profits. More specifically, an algorithm in which such a basic algorithm is applied to the bit and power allocation is called "Levin-Campello Algorithm". The algorithm is a known technology disclosed in "Optimal Discrete Bit Loading for Multicarrier Modulation Systems" (Information Theory, 1998. Proceedings. 1998 IEEE International Symposium on, 16-21 Aug. 1998, Page. 193) published by J. Campello in 1998. Accordingly, a detailed description about this algorithm will be omitted herein.

AMC_In is a value containing AMC level information corresponding to each of the Tx antennas. The value AMC_In is transmitted to an adaptive modulator 105 through the signal selector 101. The value AMC_In transmitted to the signal selector 101 is modulated into control information by the adaptive modulator 105 and is then transmitted to the receiver. The receiver determines the AMC level using the control information. In addition, the value AMC_In transmitted to the adaptive modulation 105 is used to determine the AMC level of the transmission data.

At a data transmission time interval, the signal selector 101 transmits data to the adaptive modulator 105. However, at a control information transmission interval, the signal selector 101 transmits the ordering policy information Order_In and/or the AMC level information AMC_In, which are generated from the ordering selector 107 and the AMC determiner 103, respectively.

In general, the data is modulated by the selected AMC level, and the Order_In signal and the AMC_In signal are the control information. Therefore, the data and the control information can be modulated by predetermined specific AMC levels. The data or control information selected by the signal selector 101 pass through the adaptive modulator 105 and are transmitted through the Tx antennas 109, 111, and 113 to the receiver.

Figure 2:
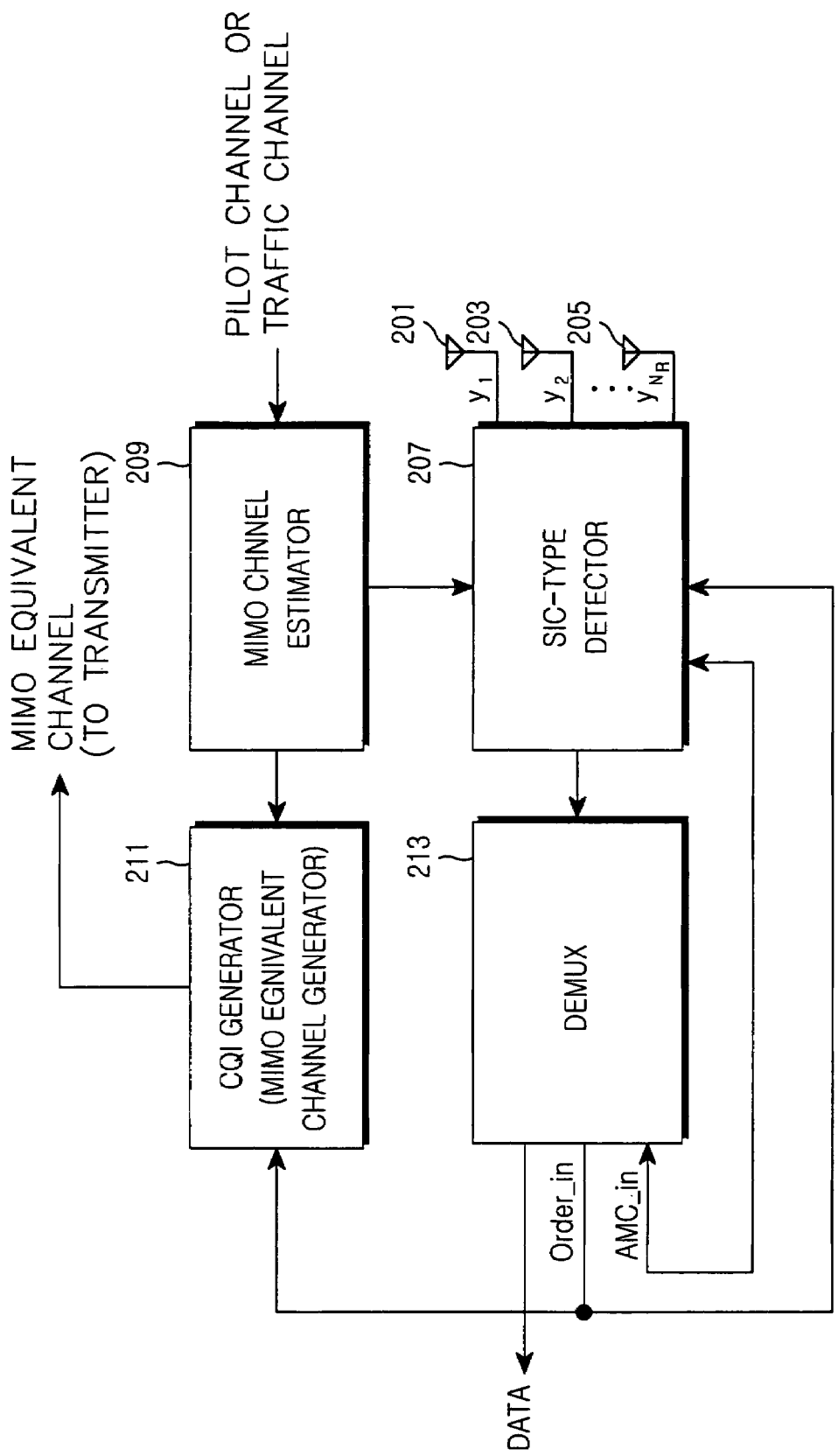
FIG. 2 is a block diagram of a receiver with a CQI generator and a SIC-type detector in a MIMO system according to an embodiment of the present invention.

FIG. 2 is a block diagram of a receiver having a CQI generator 211 and a SIC-type detector 207 in the MIMO system according to an embodiment of the present invention. Referring to FIG. 2, data signals are received through a plurality of Rx antennas 201, 203, and 205 and are demodulated into data form through a SIC-type detector 207. The SIC-type detector determines an ordering policy, i.e., a forward ordering policy or a reverse ordering policy, according to the value of Order_In, and determines a demodulation scheme according to the value of AMC_In. Preferably, Order_In and AMC_In are values transmitted to the receiver before the data from the transmitter are demodulated.

The Order_In signal has two kinds of values, which will be described later in detail.

When Order_In="FORWARD", the SIC-type detector performs the SIC based on the forward ordering policy. When Order_In="REVERSE", the SIC-type detector performs the SIC based on the reverse ordering policy. In addition, the SIC-type detector can use both a zero-forcing scheme and a minimum mean square error (MMSE) scheme. That is, the SIC-type detector 207 can selectively use the zero forcing scheme and the MMSE scheme and use the forward ordering policy or the reverse ordering policy in the selected scheme.

A MIMO channel estimator 209 estimates a MIMO channel value using a pilot channel or a traffic channel. The estimated MIMO channel value is transmitted to the SIC-type detector 207 and is used for the detection of the SIC type.

In addition, the estimated MIMO channel value is transmitted to the CQI generator (MIMO equivalent channel generator) 211 and is used for the generation of the MIMO equivalent channel. Examples of the channel estimation methods are a maximum likelihood (ML), a minimum mean square error (MMSE), a least squares (LS), etc. Accordingly, the present invention is not limited to the specific method.

The CQI generator (MIMO equivalent channel generator) 211 generates the MIMO equivalent channel based on the ordering policy using the value of the MIMO channel and the value of Order_In. This process is needed because not the MIMO channel value but the equivalent channel is required for the application of the AMC. The real MIMO equivalent channel value is smaller than the MIMO channel value by the times of the number of Rx antennas. For example, if the number of the Rx antennas is four, the MIMO equivalent channel value is four times smaller than the MIMO channel value. The generation of the MIMO equivalent channel will be described later in more detail with reference to FIG. 4.

A demultiplexer (demux) 213 transmits data in the interval for data transmission and transmits the ordering policy information Order_In and/or the AMC level information AMC_In in the interval for control information transmission. Signals input to the SIC-type detector 207 through the Rx antennas include "data" signal and "control information (AMC_In or Order_In)" signal. These signals are used for signal detection at the SIC-type detector 207 and are transmitted to the demultiplexer 213. The demultiplexer 213 receives the data signal and the control information, i.e., the ordering policy information and the AMC level information, from the SIC-type detector 207. The demultiplexer 213 transmits the data signal in the interval for the data transmission, and transits the ordering policy information and the AMC level information in the interval for control information transmission. That is, the demultiplexer 213 separately transmits the "data" and the "control information" depending on the signal intervals.

Among the control information input to the demultiplexer 213, AMC_In is transmitted to the SIC-type detector 207 because it is a value required by the SIC-type detector 207. In a prior stage, a previous AMC_In is used. In a next stage, AMC_In is updated. That is, the AMC_In value transmitted from the demultiplexer 213 is an updated value of a previous AMC_In value used in the SIC-type detector 207. The SIC-type detector 207 performs a predetermined function by using a previous value of the AMC_In value transmitted to the demultiplexer 213. The AMC_In value transmitted after the AMC_In value is transmitted to the demultiplexer 213 is used as an updated value of the previous AMC_In value.

Figure 3A:
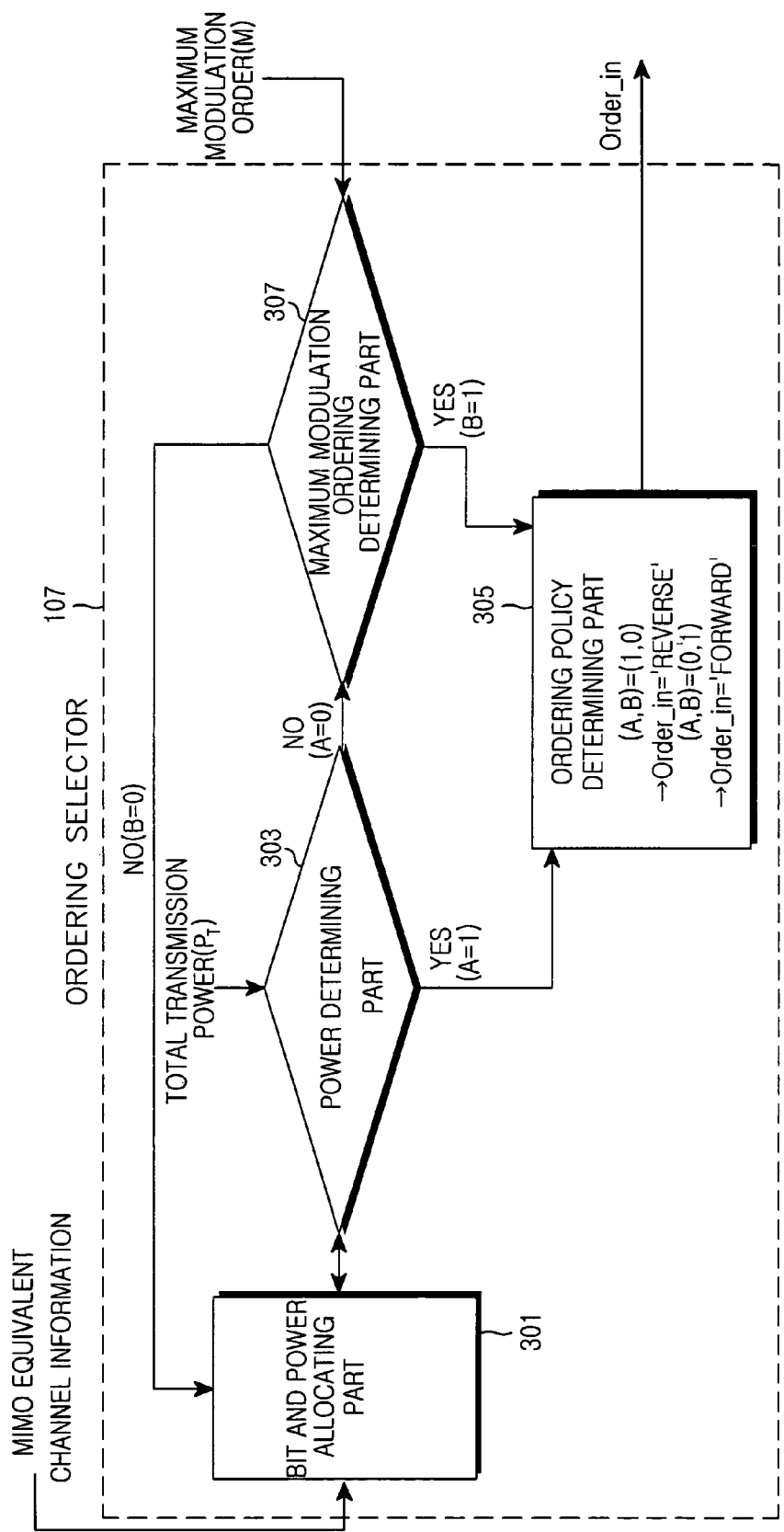
FIG. 3A is a schematic diagram of the ordering selector that selects an SIC ordering policy for an optimal AMC performance in a transmitter of a MIMO system according to an embodiment of the present invention.

FIG. 3A is a schematic diagram of the ordering selector 107 that selects a SIC ordering policy for the optimal AMC performance in the transmitter of the MIMO system according to an embodiment of the present invention. Referring to FIG. 3A, a bit and power allocating part 301 performs a bit and power allocation based on Greedy algorithm by using an initial value of the MIMO equivalent channel information transmitted from the terminal. This algorithm is equal to the algorithm that has been used in determining the AMC level. Herein, one-bit allocation is only performed. $P^*_T$ represents a sum of powers allocated so far.

After passing through the bit and power allocating part 301, if the sum $P^*_T$ of the power allocated so far exceeds a maximum transmission power $P_T$, a power determining part 303 sets A to 1 and transmits it to an ordering policy determining part 305. If $P^*_T$ is less than or equal to $P_T$, the power determining part 303 sets A to 0 and transmits it to a maximum modulation order determining part 307.

If $\max_{1 \leq t \leq N_T} C_t > M$, the maximum modulation order determining part 307 sets B to 1 and transmits it to the ordering policy determining part 305. If $\max_{1 \leq t \leq N_T} C_t \leq M$, the maximum modulation order determining part 307 sets B to 0 and transmits it to the bit and power allocating part 301. Therefore, the bit and power allocation by Greedy algorithm is again performed.

Above, $C_t$ represents the number of bits allocated to a t-th Tx antenna and does not exceed the maximum modulation order M according to a specific rule. That is, if the maximum modulation order of the system is defined, the number of bits allocated to the Tx antennas exists within this limitation. Accordingly, if B is equal to 1, $C_t$ exceeds the maximum modulation order M. Additionally, when B is equal to one, this can also indicate that the maximum transmission power $P_T$ is sufficiently great.

If A is equal to 1, it means that the power allocated so far exceeds the maximum transmission power, and can also represent that the maximum transmission power $P_T$ is not sufficiently great.

In order to maximize the AMC gain, the ordering policy determining part 305 has to use the forward ordering policy when the maximum transmission power $P_T$ is sufficient, and use the reverse ordering policy when the maximum transmission power $P_T$ is insufficient. A detailed reason for this will be described later with reference to FIG. 10.

If (A, B)=(1, 0), the ordering policy determining part 305 sets the ordering value to Order_In="REVERSE". If (A, B)=(0, 1), the ordering policy determining part 305 sets the ordering value to "FORWARD".

Figure 3B:
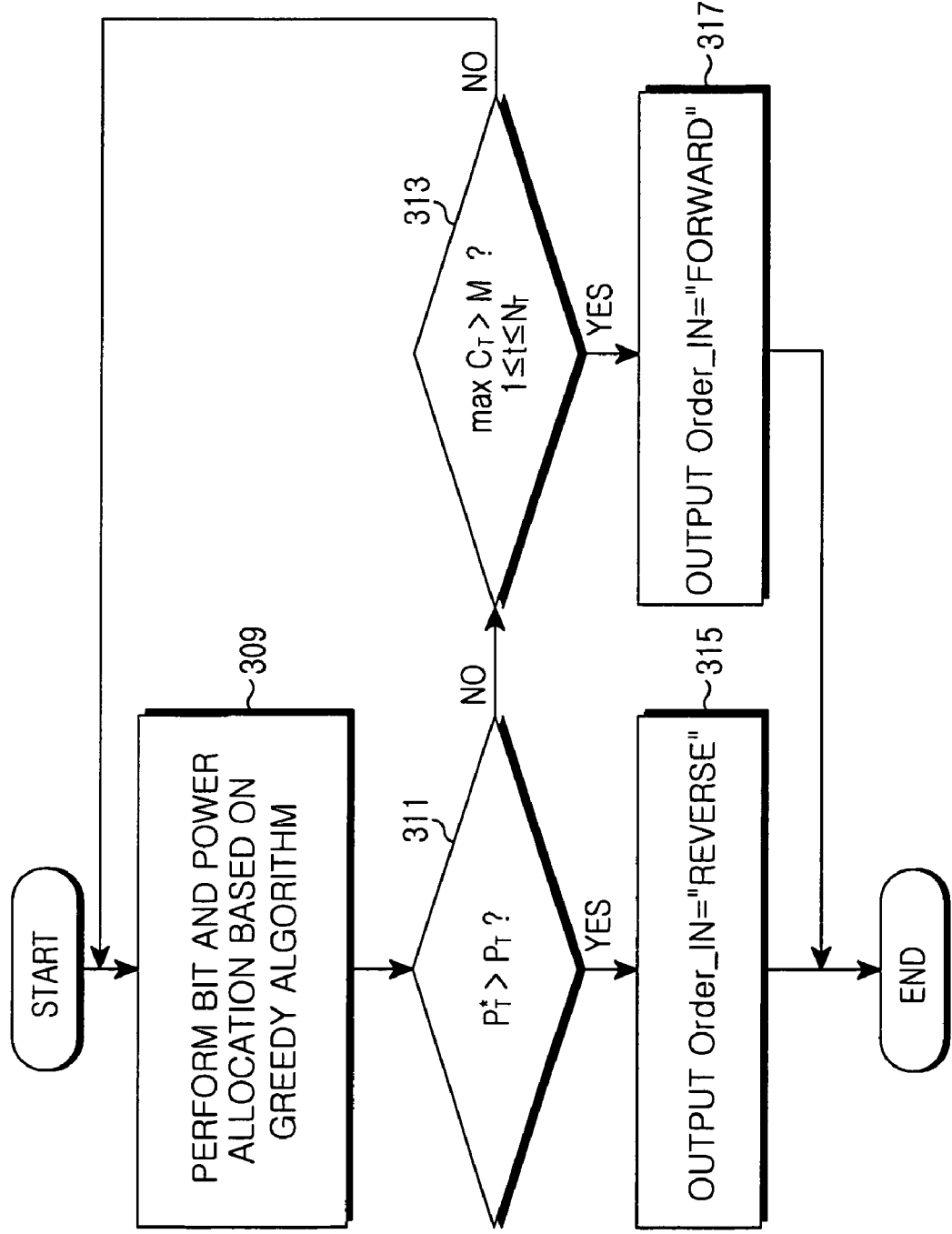
FIG. 3B is a flowchart illustrating sequential procedures of selecting an SIC ordering policy according to an embodiment of the present invention.

FIG. 3B is a flowchart illustrating sequential procedures of selecting the SIC ordering policy according to an embodiment of the present invention. Referring to FIG. 3B, in step 309, a bit and power allocation is performed based on a Greedy algorithm using an initial value of the MIMO equivalent channel information transmitted from the terminal. This algorithm is equal to the algorithm that has been used in determining the AMC level. Herein, one-bit allocation is only performed, and $P^*_T$ represents a sum of powers allocated so far.

In step 311, the power determining part 303 determines whether $P^*_T$ exceeds $P_T$ (maximum transmission power). In step 311, if $P^*_T$ exceeds $P_T$, the power determining part 303 sets A to 1 and transmits it to the ordering policy determining part 305 with B=0 from the status of $\max_{1 \leq t \leq N_T} C_t \leq M$. The ordering policy determining part 305 outputs Order_IN="REVERSE" in step 315 according to (A,B)=(1, 0).

However, if $P^*_T$ is less than or equal to $P_T$, in step 313, the maximum modulation order determining part determines if $\max_{1 \leq t \leq N_T} C_t > M$. Further, the power determining part 303 sets A to 0 and transmits it to the maximum modulation order determining part 307.

In step 313, if $\max_{1 \leq t \leq N_T} C_t > M$, the maximum modulation order determining part 307 sets B to 1 and transmits it to the ordering policy determining part 305 with A=0 from the status that $P^*_T$ is less than or equal to $P_T$. The ordering policy determining part 305 outputs Order_IN="FORWARD" in step 317 according to (A,B)=(0,1).

However, if $\max_{1 \leq t \leq N_T} C_t \leq M$, the maximum modulation order determining part 307 sets B to 0 and transmits it to the bit and power allocating part 301 which performs nit and power allocation based on greedy algorithm in step 309. Thus, the bit and power allocation by Greedy algorithm is again performed.

In steps 315 (the ordering policy determining part outputs Order_IN="REVERSE") and 317 (the ordering policy determining part 305 outputs Order_IN="FORWARD"), in order to maximize the AMC gain, the ordering policy determining part 305 selects the forward ordering policy when the maximum transmission power $P_T$ is great, and selects the reverse ordering policy when the maximum transmission power $P_T$ is small. That is, if (A, B)=(1, 0), the ordering policy determining part 305 sets the ordering value to Order_In="REVERSE". If (A, B)=(0, 1), the ordering policy determining part 305 sets the ordering value to "FORWARD".

Figure 4:
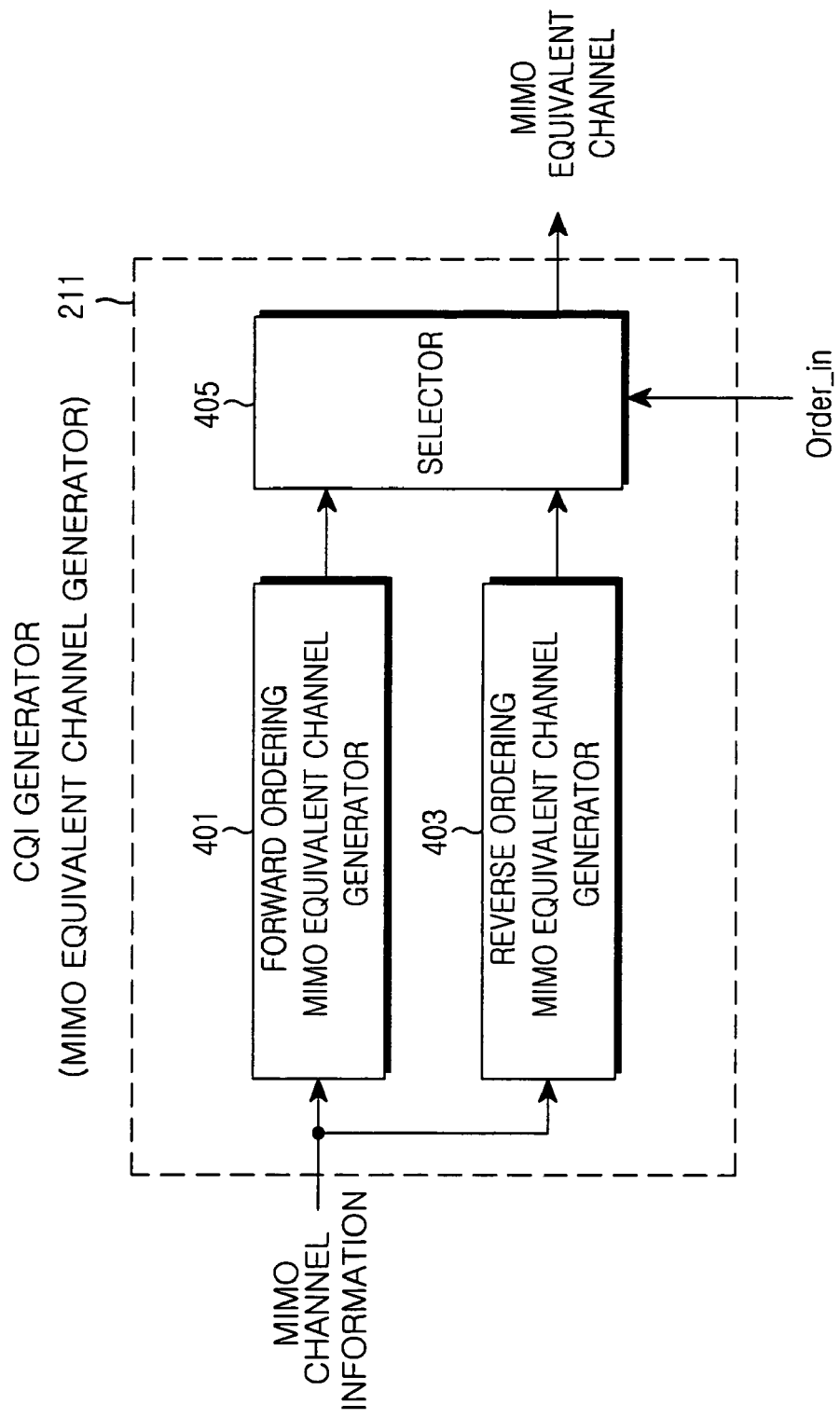
FIG. 4 is a block diagram of a CQI generator for generating a MIMO equivalent channel in the receiver of the MIMO system according to an embodiment of the present invention.

FIG. 4 is a block diagram of the CQI generator 211 for generating a MIMO equivalent channel in a receiver of the MIMO system according to an embodiment of the present invention. Referring to FIG. 4, a forward ordering MIMO equivalent channel generator 401 generates a MIMO equivalent channel based on a forward ordering policy using MIMO channel information obtained by the MIMO channel estimator 209 of the receiver illustrated in FIG. 2. This process will be described later in more detail with reference to FIG. 5.

Similarly, a reverse ordering MIMO equivalent channel generator 403 generates MIMO equivalent channel based on the reverse ordering policy using the MIMO channel information obtained by the MIMO channel estimator 209. This process will be described later in more detail with reference to FIG. 6.

The MIMO equivalent channel based on the forward ordering policy and the MIMO equivalent channel based on the revere ordering policy are input to a selector 405. If Order_In="FORWARD", the selector 405 outputs the MIMO equivalent channel based on the forward ordering policy. However, if Order_In="REVERSE", the selector 405 outputs the MIMO equivalent channel based on the reverse ordering policy.

Figure 5A:
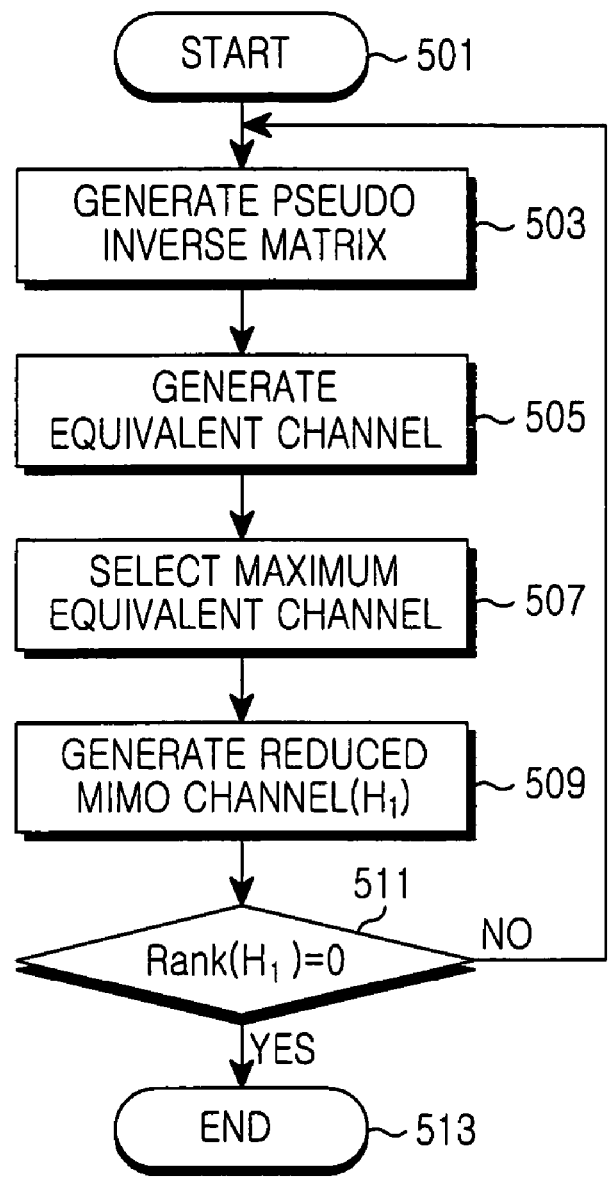
FIGS. 5A and 5B are flowcharts illustrating sequential procedures of generating a MIMO equivalent channel based on a forward ordering policy at a CQI generator in a receiver of a MIMO system according to an embodiment of the present invention.
Figure 5B:
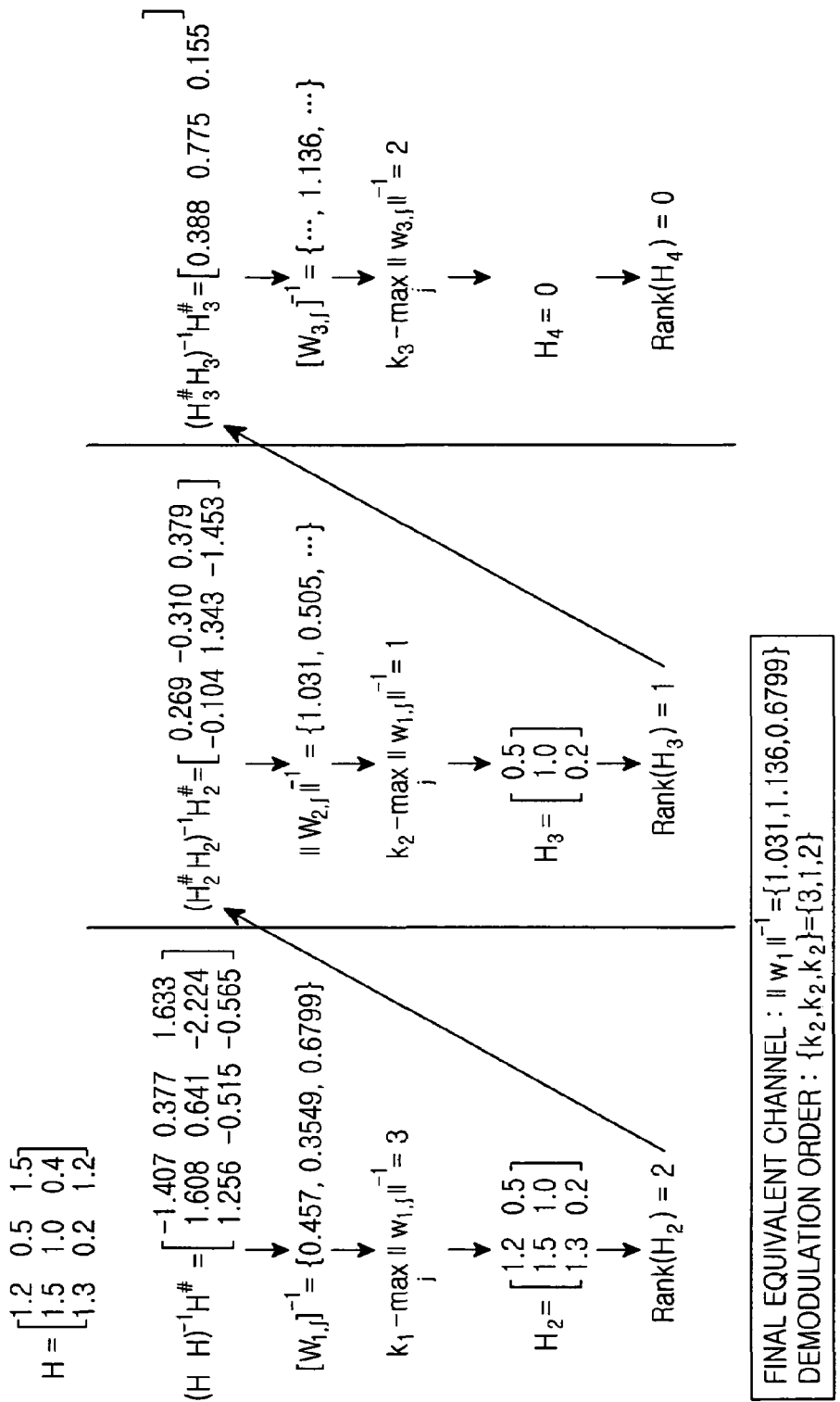

FIGS. 5A and 5B are flowcharts illustrating sequential procedures of generating a MIMO equivalent channel based on a forward ordering policy at a CQI generator in the receiver of the MIMO system according to an embodiment of the present invention. First, the process of generating the MIMO equivalent channel based on the forward ordering policy will be described with reference to FIG. 5A.

Referring to FIG. 5A, a pseudo inverse matrix $(H^H H)^{-1} H^H$ of the MIMO channel H is generated in step 503. The MIMO equivalent channel is generated using a predetermined equation relationship in step 505. Because the forward ordering SIC is used, the maximum equivalent channel is selected in step 507. A channel corresponding to a third Tx antenna is removed to generate a reduced MIMO channel in step 509. In order to ascertain if the SIC is finished, in step 511, it is determined if a rank value of the reduced MIMO channel is zero. If the rank value is not zero, the process returns to the step 503. However, if the rank value is zero, the process is terminated.

In FIG. 5B, it is assumed that the number of Tx antennas is $N_T=3$, the number of Rx antennas is $N_R=3$, and the flat fading channel gain is given by Equation (1), $$H = \begin{pmatrix} 1.2 & 0.5 & 1.5 \\ 1.5 & 1.0 & 0.4 \\ 1.3 & 0.2 & 1.2 \end{pmatrix} \quad (1)$$

The reception types of the receiver include a Zero-Forcing (ZF) scheme and a Minimum Mean Square Error (MMSE) scheme. Hereinafter, the ZF scheme will be taken as an example. Further, when the ZF scheme is used, a following reception signal has to be multiplied by the pseudo inverse matrix of the MIMO channel H. This process refers to Equations (2) and (3) below.

$$y = HPx + n \quad (2)$$

$$(H^H H)^{-1} H^H y = Px + (H^H H)^{-1} H^H n \quad (3)$$

In Equations (2) and (3), P is a 3×3 diagonal matrix for power allocation and is expressed as $$P = \begin{pmatrix} \sqrt{P_1} & 0 & 0 \\ 0 & \sqrt{P_2} & 0 \\ 0 & 0 & \sqrt{P_3} \end{pmatrix}$$

the transmission signal $x = (x_1 x_2 x_3)^T$, and noise $n = (n_1 n_2 n_3)^T$.

In order to express the MIMO equivalent channel, $(H^H H)^{-1} H^H$ is defined by Equation (4).

$$(H^H H)^{-1} H^H = \begin{pmatrix} w_{1,1}^H \\ w_{1,2}^H \\ w_{1,3}^H \end{pmatrix} \quad (4)$$

Using Equation (4), Equation (3) can be rewritten as shown in Equation (5).

$$w_{1,j}^H y = \sqrt{p_j} x_j + w_{1,j}^H n \quad (5)$$

If a noise part (n) is normalized, the result is given by Equation (6) below and the MIMO equivalent channel with respect to the transmission signal $x_j$ can be obtained.

$$\frac{w_{1,j}^H}{\|w_{1,j}\|} y = \frac{\sqrt{P_j}}{\|w_{1,j}\|} x_j + \frac{w_{1,j}^H}{\|w_{1,j}\|} n \quad (6)$$

In Equation (6), because the noise part is normalized, it can be seen that the MIMO equivalent channel with respect to the transmission signal $x_j$ is equal to $$\frac{1}{\|w_{1,j}\|}.$$

When the forward ordering SIC receiver is used, the MIMO equivalent channel $$\frac{1}{\|w_{1,j}\|}$$

varies depending on the ordering policy (the forward ordering policy or the reverse ordering policy).

FIG. 5B illustrates an example when the forward ordering policy is used. Referring to FIG. 5B, the pseudo inverse matrix $(H^H H)^{-1} H^H$ of the MIMO channel H is calculated. Then, the MIMO equivalent channel is calculated using the relationship of Equation (4). The MIMO equivalent channel is obtained as $$\|w_{1,j}\|^{-1} = \{0.4570, 03549, 0.6799\}.$$

The maximum equivalent channel is selected because the forward ordering SIC is used. That is, the equivalent channel 0.6799 of the third Tx antenna is selected. Next, the channel corresponding to the third Tx antenna part is removed to generate the reduced MIMO channel $H_2$, which is expressed as shown in Equation 7 below.

$$H_2 = \begin{pmatrix} 1.2 & 0.5 \\ 1.5 & 1.0 \\ 1.3 & 0.2 \end{pmatrix} \quad (7)$$

Next, in order to ascertain whether the SIC is finished, it is checked whether the rank value of $H_2$ is zero. If the rank value is not zero, the above processes are repeated. If the rank value is zero, the process is terminated.

Starting from the reduced MIMO channel $H_2$, the pseudo inverse matrix is generated as shown in Equation (8).

$$(H_2^H H_2)^{-1} H_2^H = \begin{bmatrix} 0.269 & -0.310 & 0.879 \\ -0.104 & 1.343 & -1.453 \end{bmatrix} \quad (8)$$

Using Equation (8), the equivalent channel can be obtained as $$\|w_{2,j}\|^{-1} = \{1.031, 0.505, \ldots\}.$$

A first Tx antenna with the maximum equivalent channel is selected and removed to generate a reduced MIMO channel $H_3$ expressed as shown in Equation (9).

$$H_3 = \begin{pmatrix} 0.5 \\ 1.0 \\ 0.2 \end{pmatrix} \quad (9)$$

A rank of the reduced MIMO channel $H_3$ is calculated so as to check whether the SIC is finished. The above processes are repeated until the rank becomes zero.

Starting from the reduced MIMO channel $H_3$, the pseudo inverse matrix is generated as shown in Equation (10).

$$(H_3^H H_3)^{-1} H_3^H = [0.388 \ 0.775 \ 0.155] \quad (10)$$

Using Equation (12), the equivalent channel can be obtained as $$\|w_{3,j}\|^{-1} = \{\ldots, 1.136, \ldots\}.$$

A second Tx antenna with the maximum equivalent channel is selected and removed to generate a reduced MIMO channel $H_4$. Because the rank of the reduced MIMO channel $H_4$ is zero, the SIC is finished.

Figure 6A:
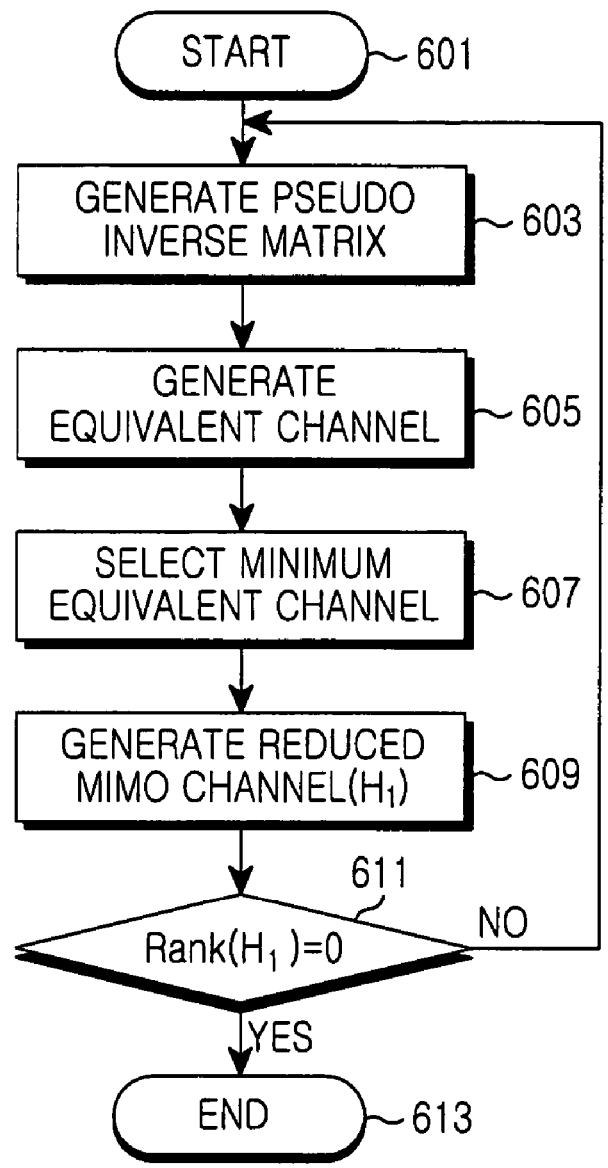
FIGS. 6A and 6B are flowcharts illustrating sequential procedures of generating a MIMO equivalent channel based on a reverse ordering policy at a CQI generator in a receiver of a MIMO system according to an embodiment of the present invention.
Figure 6B:
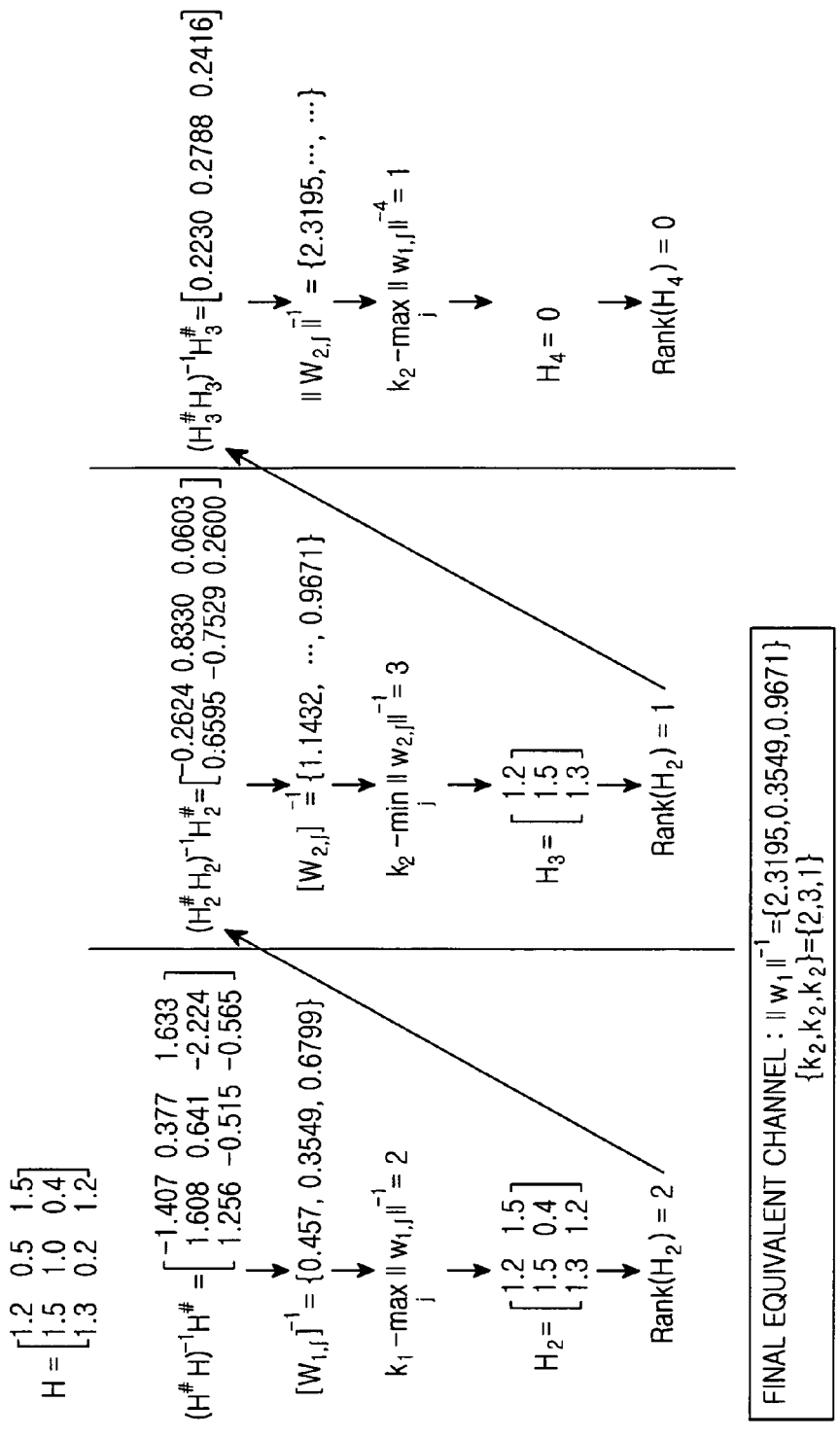

FIGS. 6A and 6B are flowcharts illustrating sequential procedures of generating a MIMO equivalent channel based on a reverse ordering policy at a CQI generator in the receiver of a MIMO system according to an embodiment of the present invention. The process of generating the MIMO equivalent channel based on the reverse ordering policy will be described with reference to FIG. 6A.

Referring to FIG. 6A, a pseudo inverse matrix $(H^H H)^{-1} H^H$ of the MIMO channel H is calculated in step 603. The MIMO equivalent channel is calculated using a predetermined equation relationship in step 605. Because the reverse ordering SIC is used, the minimum equivalent channel is selected in step 607. A channel corresponding to a second Tx antenna is removed to generate a reduced MIMO channel in step 609. In order to ascertain whether the SIC is finished, it is checked whether a rank value of the reduced MIMO channel is zero in step 611. If the rank value is not zero, the process returns to the step 603. However, if the rank value is zero, the process is terminated.

In FIG. 6B, it is assumed that the number of Tx antennas is $N_T=3$, the number of Rx antennas is $N_R=3$, and the flat fading channel gain is given by Equation (12).

$$H = \begin{pmatrix} 1.2 & 0.5 & 1.5 \\ 1.5 & 1.0 & 0.4 \\ 1.3 & 0.2 & 1.2 \end{pmatrix} \quad (12)$$

The reception types of the receiver include a Zero-Forcing (ZF) scheme and a Minimum Mean Square Error (MMSE) scheme. Hereinafter, the ZF scheme will be taken as an example.

The pseudo inverse matrix $(H^H H)^{-1} H^H$ of the MIMO channel H is calculated and then the MIMO equivalent channel is calculated. The MIMO equivalent channel is obtained as shown in Equation (13).

$$\|w_{1,j}\|^{-1} = \{0.4570, 0.3549, 0.6799\} \quad (13)$$

The minimum equivalent channel is selected because the reverse ordering SIC is used. That is, the equivalent channel 0.3549 of the second Tx antenna is selected.

Next, the channel corresponding to the second Tx antenna part is removed to generate the reduced MIMO channel $H_2$, which is expressed as shown in Equation (14).

$$H_2 = \begin{pmatrix} 1.2 & 0.5 \\ 1.5 & 0.4 \\ 1.3 & 0.2 \end{pmatrix} \quad (14)$$

In order to ascertain whether the SIC is finished, it is checked whether the rank value of $H_2$ is zero. If the rank value is not zero, the above processes are repeated.

Starting from the reduced MIMO channel $H_2$, the pseudo inverse matrix is generated as shown in Equation (15).

$$(H_2^H H_2)^{-1} H_2^H = \begin{bmatrix} -0.2624 & 0.8330 & 0.0503 \\ 0.6595 & -0.7529 & 0.2600 \end{bmatrix} \quad (15)$$

Using Equation (15), the equivalent channel can be obtained as shown in Equation (16).

$$\|w_{2,j}\|^{-1} = \{1.1432, \ldots, 0.9671\} \quad (16)$$

A third Tx antenna with the minimum equivalent channel is selected and removed to generate a reduced MIMO channel $H_3$ expressed as shown in Equation (17).

$$H_3 = \begin{pmatrix} 1.2 \\ 1.5 \\ 1.3 \end{pmatrix} \quad (17)$$

A rank of the reduced MIMO channel $H_3$ is calculated so as to check whether the SIC is finished. The above processes are repeated because the rank of the reduced MIMO channel $H_3$ is not zero.

Starting from the reduced MIMO channel $H_3$, the pseudo inverse matrix is generated as shown in Equation (18).

$$(H_3^H H_3)^{-1} H_3^H = [0.2230 \; 0.2788 \; 0.2416] \quad (18)$$

Using Equation (18), the equivalent channel can be obtained as shown in Equation (19).

$$\|w_{3,j}\|^{-1} = \{2.3195, \ldots\} \quad (19)$$

A first Tx antenna with the minimum equivalent channel is selected and removed to generate a reduced MIMO channel $H_4$. Because the rank of the reduced MIMO channel $H_4$ is zero, the SIC is finished.

Figure 7:
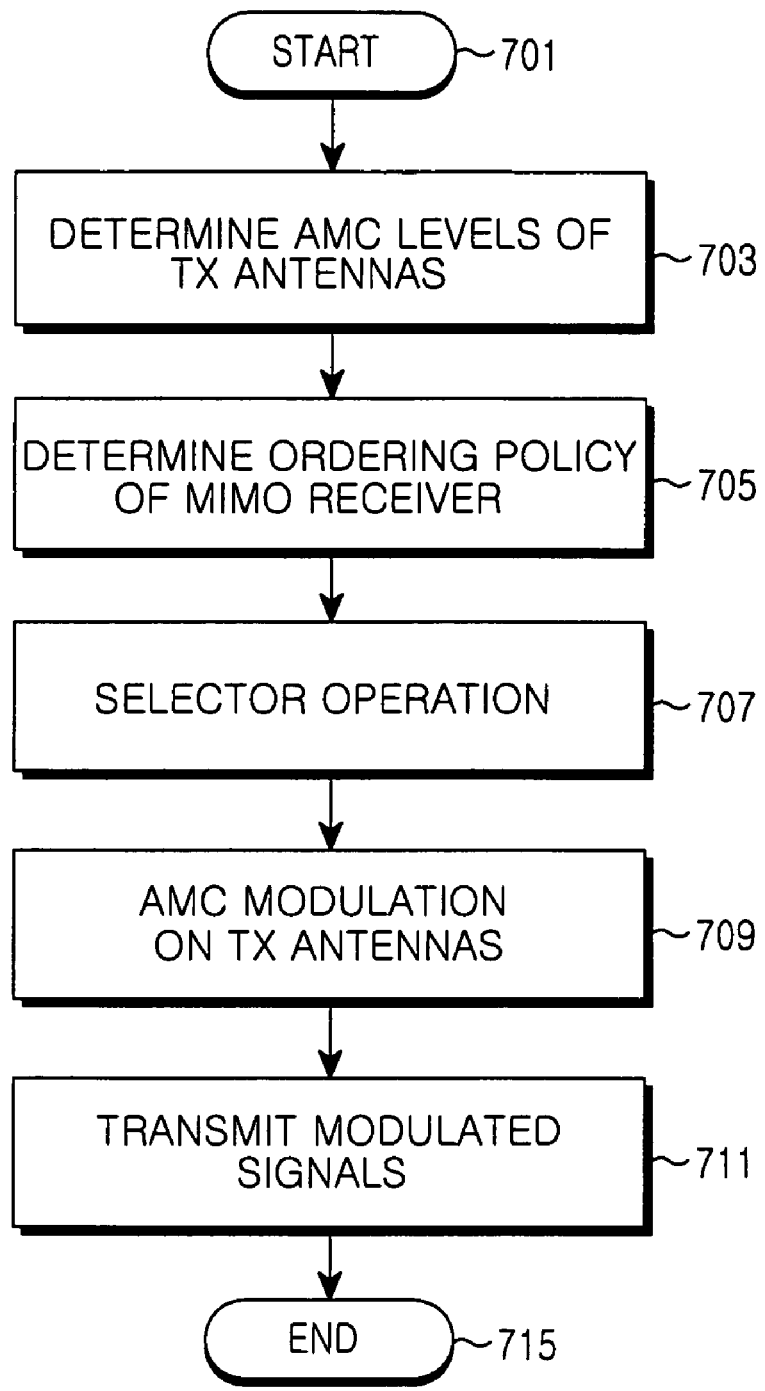
FIG. 7 is a flowchart illustrating a transmitting process including an ordering selection operation in a MIMO system according to an embodiment of the present invention.

FIG. 7 is a flowchart illustrating a transmitting process including an ordering selection operation in a MIMO system according to an embodiment of the present invention. Referring to FIG. 7, in step 703, AMC levels of the Tx antennas are determined using the MIMO channel equivalent information fed back from the receiver, the maximum modulation order, and the total transmission power. In step 705, an ordering policy of the MIMO receiver stage is determined using the MIMO channel equivalent information fed back from the receiver, the maximum modulation order, and the total transmission power. In step 707, at a data reception interval, data is selected and mapped. However, if it is a control reception interval, the control information, i.e., the ordering policy information Order_In and/or the AMC level information signal AMC_IN, is selected and mapped.

In step 709, AMC modulation is performed on the data corresponding to the Tx antennas using the AMC level information signal AMC_In. In step 711, the modulated data signals $x_1, x_2, \ldots, x_{N_T}$ are transmitted to their corresponding Tx antennas.

Figure 8:
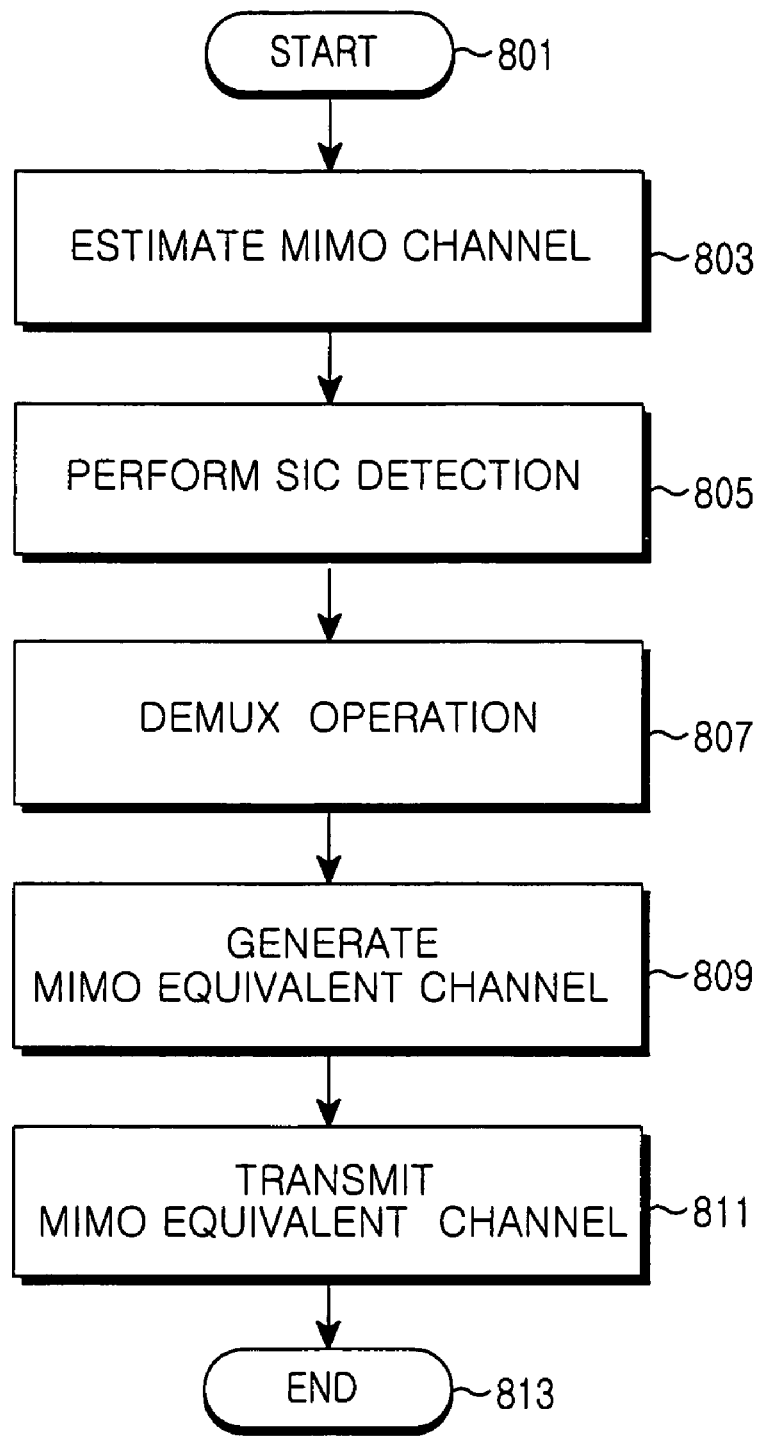
FIG. 8 is a flowchart illustrating a receiving process including a CQI generation operation and a SIC-type detection operation in a MIMO system according to an embodiment of the present invention.

FIG. 8 is a flowchart illustrating a receiving process including a CQI generation operation and a SIC-type detection operation in the MIMO system according to an embodiment of the present invention. In step 803, the MIMO channel is estimated using a pilot channel or traffic channel. An ML scheme or an MMSE scheme can be used to estimate the MIMO channel.

In step 805, the SIC detection is performed using the AMC level information AMC_IN and the ordering policy information Order_In transmitted from the transmitter, and the MIMO channel value calculated by the receiver. In step 807, at a data reception interval, data is received. However, if it is a control reception interval, the control information, i.e., the ordering policy information Order_In and/or the AMC level information AMC_In, is received.

In step 809, the MIMO equivalent channel is generated using the ordering policy information Order_In. In step 811, the MIMO equivalent channel is fed back to the transmitter and then process is terminated.

Figure 9:
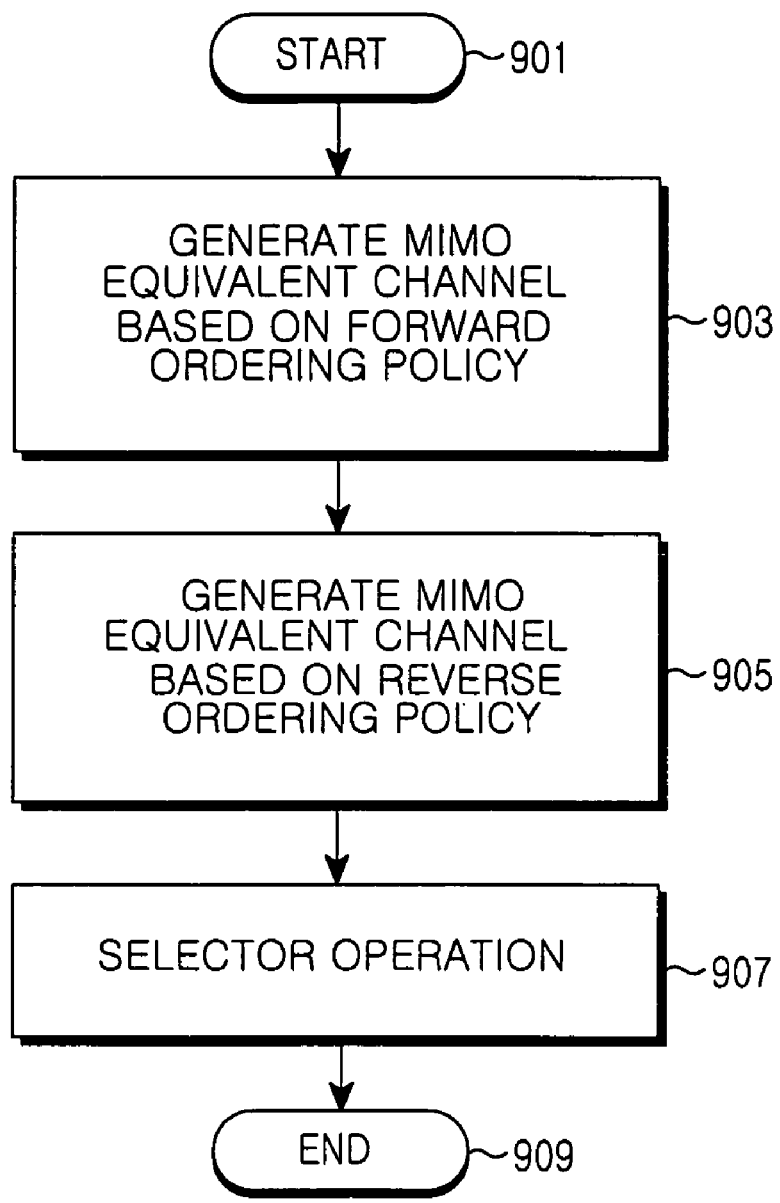
FIG. 9 is a flowchart illustrating the process of generating a MIMO equivalent channel in a receiver of a MIMO system according to an embodiment of the present invention.

FIG. 9 is a flowchart illustrating a process of generating a MIMO equivalent channel in a receiver of a MIMO system according to an embodiment of the present invention. In step 903, the MIMO equivalent channel based on the forward ordering policy is generated using the MIMO channel information. In step 905, the MIMO equivalent channel based on the reverse ordering policy is generated using the MIMO channel information. In step 909, if the ordering policy information Order_In is "FORWARD", the forward MIMO equivalent channel is selected. However, if the ordering policy information Order_In is "REVERSE", the reverse MIMO equivalent channel is selected. Thereafter, the process is terminated.

Figure 10:
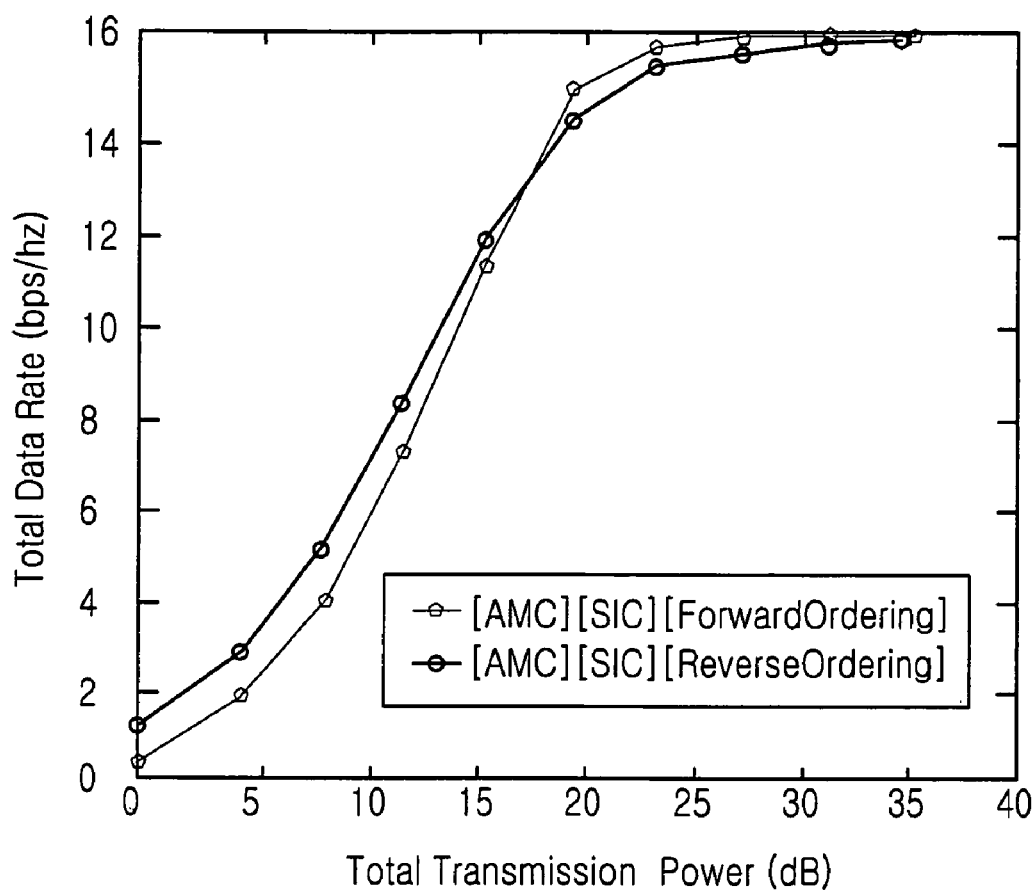
FIG. 10 is a graph illustrating performance of an ordering policy in a 4×4 MIMO system according to an embodiment of the present invention.

FIG. 10 is a graph illustrating performance, i.e., data rate, of the ordering policy in a 4×4 MIMO system according to an embodiment of the present invention. In FIG. 10, x-axis and y-axis represent the total transmission power and the total data rate, respectively.

As illustrated in FIG. 10, if the total transmission power is insufficient, the reverse ordering policy can obtain higher data rate than that of the forward ordering policy. However, if the total transmission power is sufficiently high, the forward ordering policy has higher performance.

A cross point occurs between the forward ordering and the reverse ordering because the maximum modulation order M is fixed to four in the system. That is, even though a lot of bits can be allocated because of good channel values, it is impossible to exceed four to the maximum. When the total transmission power is insufficient, the excess of the maximum modulation order does not almost occur. Therefore, the reverse ordering policy exhibits higher performance than that of the forward ordering policy.

However, when the total transmission power is very high, the excess of the maximum order occurs very frequently. In this case, power is allocated to even antennas with bad channel situation. Therefore, the equivalent channel gain is distributed relatively uniformly, such that the forward ordering policy exhibits higher gain than the reverse ordering policy.

According to the present invention, the reverse ordering policy is selected when the total transmission power is low, while the forward ordering policy is selected when the total transmission power is high. In this manner, the optimal AMC gain can be obtained.

When the AMC is applied in the MIMO system, the SIC scheme is selected according to the MIMO channel situation, the maximum transmission power, and the maximum modulation order, thereby obtaining the maximum performance of the AMC.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A transmitter of a multiple input and multiple output antenna (MIMO) system using an adaptive modulation and coding (AMC) scheme, the transmitter comprising:
   an AMC determiner in which a total transmission power and a maximum modulation order are preset, for receiving MIMO equivalent channel information fed back from a receiver, determining an AMC level to be used in a transmit (Tx) antenna using the total transmission power, the modulation order, and the MIMO equivalent channel information, and generating AMC level information;
   an ordering selector in which the total transmission power and the maximum modulation order are preset, for receiving the MIMO equivalent channel information fed back from the receiver, and generating ordering policy information to be used in the receiver using the total transmission power, the modulation order, and the MIMO equivalent channel information;
   a signal selector for receiving the AMC level information from the AMC determiner and the ordering policy information from the ordering selector, transmitting data signals at a data signal transmission interval, and transmitting the ordering policy information and the AMC level information at a control information transmission interval; and
   an adaptive modulator for modulating the ordering policy information and the AMC level information into predefined specific AMC level, and adaptively modulating the data signals according to the AMC level information.

2. The transmitter of claim 1, wherein the AMC level determined by the AMC determiner is one of binary phase shift keying (BPSK), quadrature phase shift keying (QPSK), and 16 quadrature amplitude modulation (QAM).

3. The transmitter of claim 1, wherein the ordering selector comprises:
   a bit and power allocating part for performing a bit and power allocation using an initial value of the MIMO equivalent channel information;
   a power determining part for setting A of an ordering policy (A,B) to 1, if a sum ($P^*_T$) of powers currently allocated exceeds a maximum transmission power $P_T$, and transmitting the set A, and for setting A to 0, if the sum ($P^*_T$) of powers currently allocated is less than or equal to the maximum transmission power $P_T$, and transmitting the set A;
   a maximum modulation order determining part for setting B of the ordering policy (A,B) to 1 if $\max_{1 \leq t \leq N_T} C_t > M$, where $C_t$ represents a number of bits allocated to a t-th Tx antenna and does not exceed a maximum modulation order M, and transmitting the set B, and for setting B to 0, if $\max_{1 \leq t \leq N_T} C_t \leq M$, where $N_T$ is a number of Tx antennas, and transmitting the set B to the bit and power allocating part; and
   an ordering policy determining part for setting the ordering policy to "REVERSE" if a value of (A, B)=(1, 0) is received from the power determining part, and for setting the ordering policy to "FORWARD" if a value of (A, B)=(0, 1) is received from the maximum modulation order determining part.

4. A receiver of a multiple input and multiple output antenna (MIMO) system using adaptive modulation and coding (AMC), the receiver comprising:
   a MIMO channel estimator for estimating a MIMO channel value using one of a pilot channel and a traffic channel;
   a SIC (successive interference cancellation)—type detector for receiving a data signal and control information, the control information including an ordering policy information and an AMC level information, from a transmitter through a receive (Rx) antenna, transmitting the data signal and the control signal, determining an SIC ordering policy according to the ordering policy information, and determining a modulation scheme of the received data signal according to the AMC level information;
   a demultiplexer for receiving the data signal, the ordering policy information, and the AMC level information from the SIC-type detector, transmitting the data signal in an interval for data signal transmission; transmitting the ordering policy information and the AMC level information in an interval for control information transmission, and feeding back the AMC level information to the SIC-type detector; and a channel quality information (CQI) generator for generating a MIMO equivalent channel based on the ordering policy using the estimated MIMO channel value and the ordering policy information, and transmitting the MIMO equivalent channel to the transmitter.

5. The receiver of claim 4, wherein the CQI generator comprises:
   a forward ordering MIMO equivalent channel generator for generating the MIMO equivalent channel based on a forward ordering policy using the MIMO channel information;
   a reverse ordering MIMO equivalent channel generator for generating the MIMO equivalent channel based on a reverse ordering policy using the MIMO channel information, in parallel with the generation of the MIMO equivalent channel based on the forward ordering policy; and
   a selector for selecting and outputting the MIMO equivalent channel received from the forward ordering MIMO equivalent channel generator, if the ordering policy information (Order_In) from the transmitter is "FORWARD", and selecting and outputting the MIMO equivalent channel received from the reverse ordering MIMO equivalent channel generator, if the ordering policy information (Order_In) from the transmitter is "REVERSE".

6. The receiver of claim 4, wherein the MIMO equivalent channel value is calculated using $$\frac{w_{1,j}^H}{\|w_{1,j}\|}y = \frac{\sqrt{P_j}}{\|w_{1,j}\|}x_j + \frac{w_{1,j}^H}{\|w_{1,j}\|}n$$

where a MIMO equivalent channel with respect to a transmission signal $x_j$ is $$\frac{1}{\|w_{1,j}\|},$$

$$(H^H H)^{-1} H^H = \begin{pmatrix} w_{1,1}^H \\ w_{1,2}^H \\ w_{1,3}^H \end{pmatrix},$$

$$w_{1,j}^H y = \sqrt{p_j} x_j + w_{1,j}^H n,$$

$$P = \begin{pmatrix} \sqrt{P_1} & 0 & 0 \\ 0 & \sqrt{P_2} & 0 \\ 0 & 0 & \sqrt{P_3} \end{pmatrix}, \text{ and}$$

H is a MIMO channel matrix, w is a substitution matrix representing a MIMO equivalent, P represents power, and n represents noise.

7. A transmitting method of a multiple input and multiple output antenna (MIMO) system using adaptive modulation and coding (AMC), the transmitting method comprising the steps of:
   determining AMC levels of transmit (Tx) antennas using a MIMO equivalent channel information fed back from a receiver, a preset maximum modulation order, and a preset total transmission power;
   generating AMC level information from the determined AMC levels;
   determining an SIC (successive interference cancellation) ordering policy of the receiver using the MIMO equivalent channel information, the preset maximum modulation order, and the preset total transmission power;
   generating an ordering policy information using the SIC ordering policy;
   selecting data signals at a data signal transmission interval; and
   selecting the ordering policy information and the AMC level information at a control information transmission interval.

8. The transmitting method of claim 7, further comprising:
   performing an AMC modulation of the data signals using the AMC level information; and
   transmitting the modulated data signal through the Tx antennas.

9. The transmitting method of claim 7, wherein the step of generating the ordering policy information comprises the steps of:
   performing a bit and power allocation using an initial value of the MIMO equivalent channel information;
   if a sum ($P^*_T$) of powers currently allocated exceeds a maximum transmission power $P_T$, setting A of an ordering policy (A,B) to 1 and determining an ordering policy;
   if the sum ($P^*_T$) of the powers currently allocated is less than or equal to the maximum transmission power $P_T$, setting A to 0 and determining a maximum modulation order;
   if $\max_{1 \leq t \leq N_T} C_t > M$, where $N_T$ is a number of Tx antennas and $C_t$ represents a number of bits allocated to a t-th Tx antenna and does not exceed the maximum modulation order M, setting B of the ordering policy (A,B) to 1 and determining the ordering policy;
   if $\max_{1 \leq t \leq N_T} C_t \leq M$, setting B to 0 and performing a bit and power allocation;
   setting the ordering policy information="REVERSE", if a value of (A, B)=(1, 0) is received; and
   setting the ordering policy information="FORWARD" if a value of (A, B)=(0, 1) is received.

10. A receiving method of a multiple input and multiple output antenna (MIMO) system using adaptive modulation and coding (AMC), the receiving method comprising the steps of:
   estimating a MIMO channel value using one of a pilot channel and a traffic channel;
   receiving data signals and control information, the control information including an ordering policy information and an AMC level information, from a transmitter;
   determining an SIC ordering policy according to the ordering policy information;
   determining a modulation scheme of the received data signal according to the AMC level information;
   receiving the data signals at a data signal transmission interval;
   receiving the ordering policy information and the AMC level information at a control information transmission interval;
   generating a MIMO equivalent channel based on the ordering policy using the MIMO channel value and the ordering policy information; and
   feeding back the MIMO equivalent channel information to the transmitter.

11. The receiving method of claim 10, wherein the step of generating the MIMO equivalent channel comprises the steps of:

generating the MIMO equivalent channel based on a forward ordering policy using the MIMO channel information;

generating the MIMO equivalent channel based on a reverse ordering policy using the MIMO channel information, in parallel with the generation of the MIMO equivalent channel based on the forward ordering policy;

if the ordering policy information from the transmitter is "FORWARD", selecting and outputting the MIMO equivalent channel based on the forward ordering policy; and if the ordering policy information from the transmitter is "REVERSE", selecting and outputting the MIMO equivalent channel based on the reverse ordering policy.

* * * * *